United States Patent
Leutner

(10) Patent No.: US 8,360,910 B2
(45) Date of Patent: Jan. 29, 2013

(54) WORM-BELT TRANSMISSION OF A POWER-STEERING DRIVE

(75) Inventor: Wilfried Leutner, Schwaebisch Gmuend (DE)

(73) Assignee: ZF Lenksysteme GmbH, Schwaebisch Gmuend (DE)

( * ) Notice: Subject to any disclaimer, the term of this patent is extended or adjusted under 35 U.S.C. 154(b) by 702 days.

(21) Appl. No.: 12/296,405

(22) PCT Filed: Mar. 14, 2007

(86) PCT No.: PCT/EP2007/052410
§ 371 (c)(1),
(2), (4) Date: Apr. 15, 2009

(87) PCT Pub. No.: WO2007/115891
PCT Pub. Date: Oct. 18, 2007

(65) Prior Publication Data
US 2009/0250286 A1    Oct. 8, 2009

(30) Foreign Application Priority Data
Apr. 7, 2006 (DE) .......................... 10 2006 016 429

(51) Int. Cl.
*B62D 5/04* (2006.01)
(52) U.S. Cl. ........................................ 474/148; 180/444
(58) Field of Classification Search .................. 180/443, 180/444; 474/8–46; 475/25
See application file for complete search history.

(56) References Cited

U.S. PATENT DOCUMENTS

| | | | |
|---|---|---|---|
| 6,705,423 B2 * | 3/2004 | Ozsoylu et al. | 180/444 |
| 6,708,796 B2 * | 3/2004 | Kinme et al. | 180/444 |
| 6,900,564 B2 * | 5/2005 | Kobayashi et al. | 310/83 |
| 6,938,722 B2 * | 9/2005 | Sasaki et al. | 180/444 |
| 7,191,866 B2 * | 3/2007 | Sasaki et al. | 180/444 |
| 7,237,647 B2 * | 7/2007 | Nakamura et al. | 180/444 |
| 7,490,696 B2 * | 2/2009 | Saruwatari et al. | 180/444 |
| 7,591,342 B2 * | 9/2009 | Ozsoylu et al. | 180/444 |
| 7,637,348 B2 * | 12/2009 | Namgung | 180/444 |
| 2002/0017420 A1 | 2/2002 | Kinme et al. | |
| 2004/0222036 A1 | 11/2004 | Berhard et al. | |
| 2005/0121251 A1 * | 6/2005 | Ueno et al. | 180/444 |
| 2005/0189162 A1 * | 9/2005 | Sasaki et al. | 180/444 |

FOREIGN PATENT DOCUMENTS

| | | |
|---|---|---|
| DE | 101 23 767 | 11/2001 |
| JP | 5-24544 | 2/1993 |
| JP | 2004-338553 | 12/2004 |
| JP | 2005-349861 | 12/2005 |

OTHER PUBLICATIONS

International Search Report, PCT/EP2007/052410, dated Jul. 4, 2007. Search Report, German Patent Application No. 10 2006 016 429.6, dated Apr. 20, 2007.
Written Opinion of the International Searching Authority, PCT/EP2007/052410, dated Jul. 4, 2007 (English-language translation provided).
International Preliminary Report on Patentability, PCT/EP2007/052410, dated Jun. 6, 2008 (English-language translation provided).

* cited by examiner

*Primary Examiner* — William E Dondero
*Assistant Examiner* — Mark K Buse
(74) *Attorney, Agent, or Firm* — Kenyon & Kenyon LLP

(57) ABSTRACT

A power-steering drive for a steering system in a motor vehicle includes a motor driving a motor shaft and a transmission situated between the motor shaft and an output shaft. The transmission takes the form of a combined worm-belt transmission. Furthermore, in a method for adjusting the transmission of a power-steering drive, the adjustment is performed by solely adjusting the intermediate shaft relative to the motor shaft and/or the output shaft.

13 Claims, 2 Drawing Sheets

WORM-BELT TRANSMISSION OF A POWER-STEERING DRIVE

FIELD OF THE INVENTION

The present invention relates to a power-steering drive and a method for adjusting the transmission of a power-steering drive.

BACKGROUND INFORMATION

Certain power-steering drives having a single-stage or two-stage belt transmission are conventional. In two-stage belt transmissions, the belt pulleys may have a smaller diameter as compared to a power-steering drive having a single-stage belt transmission, because the overall transmission ratio results from a product of the individual transmission ratios. A disadvantage in conventional power-steering drives is the limited, maximally possible transmission ratio since the available space is limited. In very large transmission ratios, the driven belt pulley must be selected to be so large that there is hardly a chance for installing it in a motor vehicle. A large transmission ratio is desirable, however, if one wants to achieve high servo torques using relatively small electric motors.

It is furthermore conventional to use power-steering drives having worm transmissions. In this instance, the worm is coupled by a dog clutch to the motor shaft for example. The worm normally drives a worm wheel connected in a rotatably fixed manner to the steering shaft. Often, the worm is adjusted to the worm wheel to prevent bothersome noises. The worm transmission is likewise limited in terms of transmission ratio since otherwise the efficiencies for turning in and/or turning back become too unfavorable.

SUMMARY

Example embodiments of the present invention provide a power-steering drive that makes it possible to achieve large transmission ratios in a small space. Furthermore, example embodiments of the present invention provide a method for adjusting the transmission of such a power-steering drive.

Example embodiments of the present invention provide the transmission between the motor shaft and the output shaft as a combined worm-belt transmission, the overall transmission ratio being obtained by multiplying the transmission ratio of the worm transmission segment by the transmission ratio of the belt transmission segment. The belt transmission segment may be arranged such that it has a transmission ratio of at least 1:2, e.g., between approximately 1:2.5 and 1:4. The worm transmission segment may have a transmission ratio of at least 1:8, e.g., in the range between 1:10 and 1:15. The overall transmission ratio is at least 1:25 and is, e.g., in a range between 1:30 and 1:40. Using example embodiments of the present invention it is possible to achieve large transmission ratios in an extremely compact construction. Small and therefore cost-effective electric motors may be used. Furthermore, it is possible to adjust the belt tension and the relative position between worm and worm wheel in a simple and cost-effective manner. The output shaft of the power-steering drive may include a steering shaft of the steering system or the input shaft of a steering gear, particularly a rack-and-pinion steering.

Example embodiments provide for the transmission of the power-steering drive to have, in addition to the motor shaft and the output shaft, an intermediate shaft, which takes the form of a transmission worm.

According to example embodiments of the present invention, the intermediate shaft is coupled to the motor shaft via a belt, the belt being mounted onto a first belt pulley that is situated in a rotatably fixed manner on the motor shaft and on a second belt pulley that is situated in a rotatably fixed manner on the intermediate shaft.

In further example embodiments of the present invention, the intermediate shaft or the worm segment of the intermediate shaft mates with a worm wheel situated in a rotatably fixed manner on the output shaft, in particular the steering shaft.

There may be a provision for the intermediate shaft to be situated in parallel to the motor shaft and for the output shaft to extend transversely with respect to the intermediate shaft and the motor shaft.

Example embodiments of the present invention provide for the intermediate shaft to be, e.g., exclusively adjustable in its relative position with respect to the motor shaft and/or to the output shaft. After releasing a fixing element of the intermediate shaft it is possible to adjust the intermediate shaft, whereby the desired belt tension is applied and/or the desired relative position between worm and worm wheel is adjustable, in particular in one work step. The entire transmission may be adjusted by shifting only one element, in this case the intermediate shaft, e.g., using an external shaft shifting tool, in particular by applying a defined adjusting force in a defined direction of force. If the adjustment is performed using an external shaft shifting tool, adjusting aids integrated into the power-steering drive may be omitted. It is also possible to provide such adjusting aids such as adjusting screws and/or spring force assisted tension rollers for example.

If the intermediate shaft is shiftable after releasing a fixing mechanism, then, in example embodiments of the present invention, the motor shaft and the output shaft may be situated in a fixed, non-adjustable position relative to each other in the power-steering drive, which overall substantially decreases the required structural measures since respective adjusting devices and fixing devices may be omitted.

The intermediate shaft that has been brought into the exact position may be fixed in the desired position, for example, by welding, crimping sheet metal parts, clamping or bolting. The intermediate shaft, however, may be fixed exclusively by an axial bracing against at least one component, in particular a component of the power-steering drive, e.g., against a housing. A direct support in the radial direction may be omitted. For this purpose, the intermediate shaft or the component bearing the intermediate shaft is received, e.g., with radial play around its entire periphery, in at least one receiving opening or is guided through the latter.

There are various options for supporting the intermediate shaft in a rotatable manner. A first alternative provides for the intermediate shaft to be supported in a rotatable manner on a spindle. In particular, this spindle is braced axially against a component using the fixing arrangement. For this purpose, the spindle may extend through at least one opening with radial play around its entire periphery such that, when the axial bracing is released, the spindle and thus the intermediate shaft is shiftable in radial directions within the limits predetermined by the edge of the opening. It is possible to brace the spindle only on one side or on both sides against a component.

According to one alternative, the intermediate shaft is received radially within a shaft bearing. The shaft bearing in turn or a spindle connected to the shaft bearing housing in a rotatably fixed manner may be braced in the axial direction against one component or against several components. For this purpose, a radial play may be provided around the shaft bearing or the spindle in order to be able to adjust the intermediate shaft with the shaft bearing in a radial plane when the fixing device(s) are released and thus to be able to pretension the at least one belt and/or adjust the relative position between the worm and the worm wheel.

Furthermore, example embodiments of the present invention provide a method for installing or adjusting the transmission of a power-steering drive for a motor vehicle, the power-steering drive having a motor shaft, an intermediate shaft in the form of a worm and an output shaft. Example embodiments of the present invention provide for the adjustment of the transmission, that is, the pretensioning of the belt transmission segment and/or the modification of the relative position between the worm and the worm wheel to be performed solely by adjusting the intermediate shaft in the form of a worm.

According to a first alternative, the adjustment of the intermediate shaft occurs by a defined, predetermined adjusting force in a defined direction of force. For this purpose, the currently applied adjusting force may be measured by at least one sensor during the adjusting process. For example, the adjustment is performed by an independent shaft shifting device, which is not part of the power-steering drive and which engages, e.g., on two contact segments, though at least on one contact segment, on the intermediate shaft or a component rigidly connected to the intermediate shaft and may be operated electromotively. In this case, the adjustment of the belt tension occurs not by adjusting a predetermined travel, but by applying a defined adjusting force. If the intermediate shaft to be adjusted has a defined adjusting force applied to it, then this results in a defined pretensioning force of the belt(s) connected to the intermediate shaft. Measuring the belt tension during or after the adjustment is not required. For example, only the applied adjusting force in the desired direction of force is measured.

According to a second alternative, the adjustment of the belt tension and/or of the relative position between the intermediate shaft having the worm segment and the worm wheel occurs via the adjustment by a travel. If the belt tension is adjusted via a travel adjustment, then the belt tension must be measured during the adjusting process. The adjustment by a travel is particularly suitable for setting the relative position between the intermediate shaft having the worm segment and the worm wheel. For this purpose, the intermediate shaft having the worm segment is adjusted relative to the worm wheel, for example in the direction of the worm wheel, until the force rises in the adjusting direction. The rise of the force is an indicator that the worm segment of the intermediate shaft is contacting the worm wheel. After the contact to the worm wheel has been established, the intermediate shaft may be adjusted back by a certain travel in order to obtain a defined play between the intermediate shaft or worm segment and the worm wheel.

Further features and aspects of example embodiments of the present invention are described in more detail below with reference to the appended Figures.

DETAILED DESCRIPTION

Figure 1:
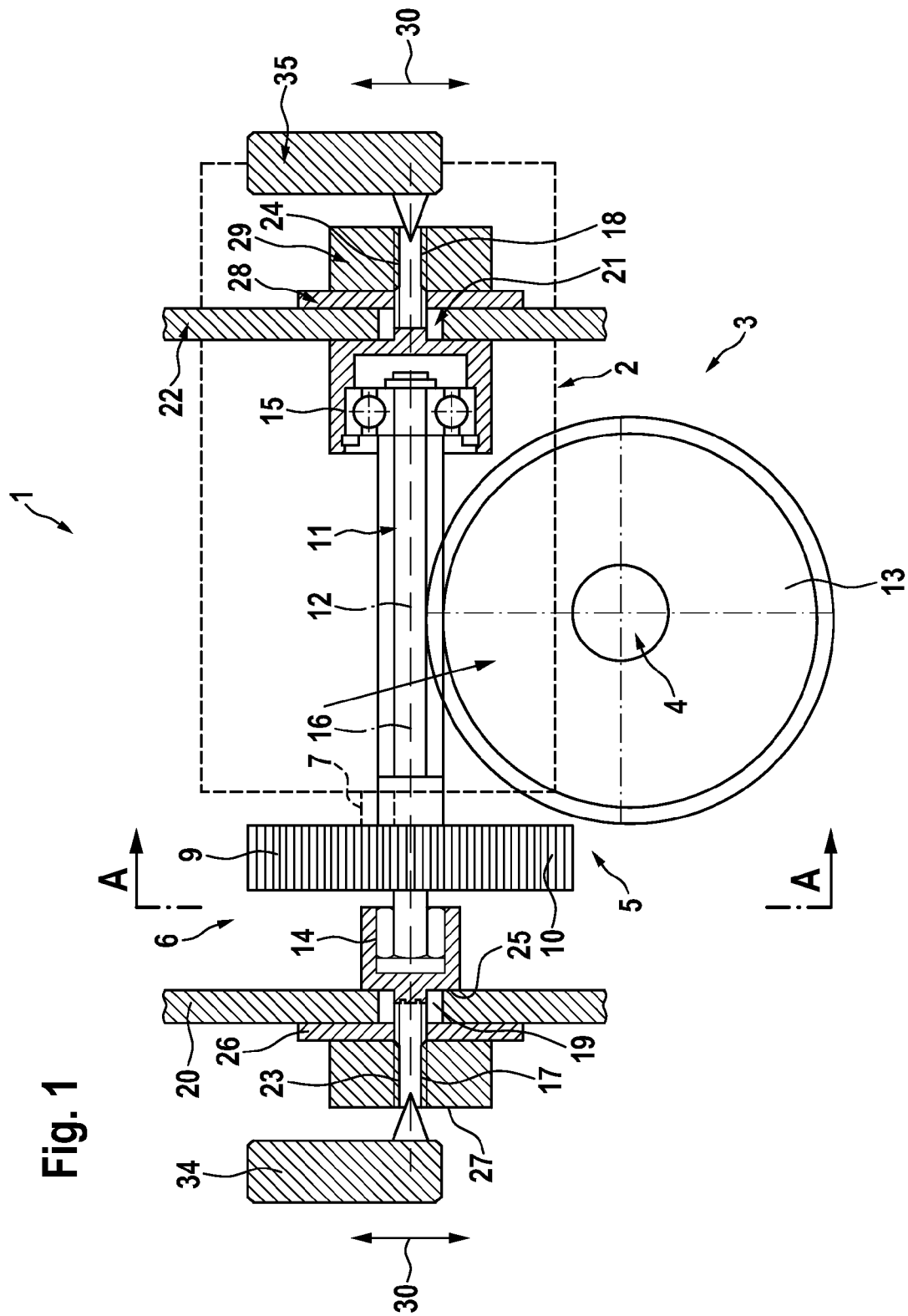
FIG. 1 is a schematic view of a power-steering drive having an intermediate shaft in the form of a worm.

In the figures, the same components and components having the same function are designated by the same reference numerals.

FIG. 1 shows a power-steering drive 1 for a motor vehicle steering system that is not shown in greater detail. The steering force applied by the driver may be supported by power-steering drive 1. For this purpose, the torque provided by an electric motor 2 is transmitted via a transmission 3 onto an output shaft 4, that is, a steering shaft.

Transmission 3 includes a worm transmission segment 5 and a belt transmission segment 6. Belt transmission segment 6 includes a first, small belt pulley 8 mounted in a rotatably fixed manner on a motor shaft 7, which is coupled via a belt 9, e.g., a toothed belt, to a second, large belt pulley 10. Second belt pulley 10 is mounted in a rotatably fixed manner on an intermediate shaft 11.

At an axial distance from second belt pulley 10, intermediate shaft 11 takes the form of a worm, that is, it has a worm segment 12. Worm segment 12 mates with a worm wheel 13. Worm wheel 13 is mounted in a rotatably fixed manner on the output shaft and drives the latter. The torque of electric motor 2 is accordingly transmitted via motor shaft 7 having first belt pulley 8 onto intermediate shaft 11 or onto second belt pulley 10 connected in a rotatably fixed manner to intermediate shaft 11 and from worm segment 12 of intermediate shaft 11 onto worm wheel 13 connected in a rotatably fixed manner to output shaft 4 and thus onto the output shaft, in particular the steering shaft.

The left end of intermediate shaft 11 in FIG. 1 is supported in a rotatable manner by a roller bearing 14. The right end of intermediate shaft 11 is supported radially and axially by a ball bearing 15. Roller bearing 14 has a rigid first prolongation 17 situated coaxially with respect to longitudinal axis 16 of intermediate shaft 11. Analogously, ball bearing 15 has a second prolongation 18 situated coaxially to longitudinal axis 16 and pointing in a direction opposite to first prolongation 17. First and second prolongation 17, 18 are used for fixing roller bearing 14 or ball bearing 15 and thus intermediate shaft 11. First prolongation 17 extends, with radial play over its entire circumference, through an opening 19 in a first housing part 20 of power-steering drive 1. Analogously, second prolongation 18 extends, with radial play over its entire circumference, through a second opening 21 in a second housing part 22. Both prolongations 17, 18 are provided on their free end with respectively one outer thread 23, 24. Roller bearing 14 abuts with a radial section 25 on the inner side of first housing part 20. A disk 26 is situated on the outside of first housing part 20, which is slid onto first prolongation 17 and abuts upon housing part 20 from outside. A first nut 27 is screwed onto outer thread 23 of first prolongation 17, which nut axially braces roller bearing 14 of intermediate shaft 11 against first housing part 20. Analogously, roller bearing 15 is braced axially against second housing part 22. Second prolongation 18 extends through second opening 21 of second housing part 22. A second disk 28 is slid on from the outside in the axial direction. The axial bracing occurs via a second nut 29, which is screwed onto outer thread 24 of second prolongation 18 which braces ball bearing 15 axially against housing part 22.

Figure 2:
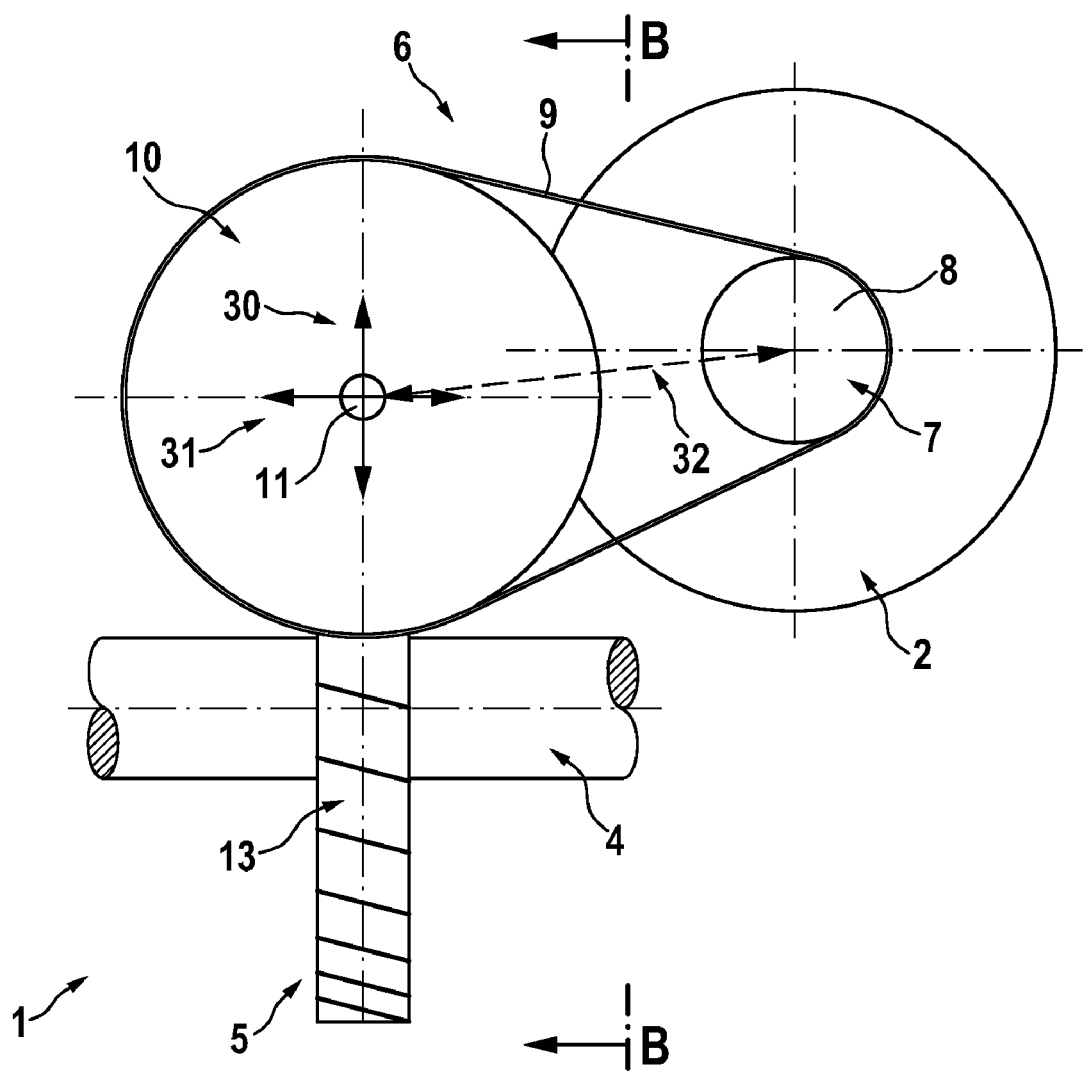
FIG. 2 illustrates the power-steering drive rotated by 90° and sectioned along the sectional line A-A as shown in FIG. 1.

After unscrewing the two nuts 27, 29, intermediate shaft 11 may be shifted along radial directions 30, 31 illustrated in FIG. 2, which changes distance 32 between intermediate shaft 11 and motor shaft 7 and thus the pretension of belt 9. At the same time, intermediate shaft 11 is adjusted relative to worm wheel 13, which makes it possible to optimize the interaction between worm segment 12 and worm wheel 13, in particular with a view to a low noise generation.

Intermediate shaft 11 is shifted by a shaft shifting device, shown schematically, having two adjusting arms 34, 35 set apart in the axial direction. Adjusting arms 34, 35 engage laterally and axially by conical points in centering bore holes of prolongations 17, 18. Each adjusting arm 34, 35 has sensors assigned to it for measuring the respective adjusting force. The adjusting forces are determined prior to the adjustment on the basis of the setpoint belt forces and the torques acting on the intermediate shaft as a result of these belt forces. The sensors may be placed directly adjacent to spindle 11. Shaft shifting device or adjusting arms 34, 35 are adjusted until the previously ascertained adjusting forces or the belt forces are applied on adjusting arms 34, 35. Adjusting arms 34, 35 may be adjusted independently of each other using at least one electric motor. According to an alternative it is possible that the two adjusting arms 34, 35 are only jointly adjustable. It is possible that adjusting arms 34, 35 do not engage axially with prolongations 17, 18, but engage laterally with intermediate shaft 11 or with a component connected to the intermediate shaft. It is possible to provide only one single adjusting arm, which holds intermediate shaft 11 when making the adjustment such that intermediate shaft 11 cannot tilt in the radial direction. After reaching the desired adjusting position, that is, after the desired adjusting force is applied in the predetermined direction of force, nuts 27, 29 are tightened and the adjusting position thus found is fixed. Alternatively, fixing in place may also be achieved by welding, deforming, etc.

What is claimed is:

1. A power-steering drive for a steering system in a motor vehicle, comprising:
    a motor including a motor shaft;
    an output shaft; and
    a combined worm-belt transmission arranged between the motor shaft and the output shaft, the transmission including an adjustable intermediate shaft arranged as a worm, the intermediate shaft being adjustable in a radial direction over an entire length of the intermediate shaft and parallel to the motor shaft.

2. The power-steering drive according to claim 1, further comprising:
    a first belt pulley arranged on the motor shaft in a rotatably fixed manner; and
    a second belt pulley arranged in a rotatably fixed manner on the intermediate shaft; and
    a belt coupled between the first belt pulley and the second belt pulley.

3. The power-steering drive according to claim 1, further comprising a worm wheel, engaging the worm, arranged in a rotatably fixed manner on the output shaft.

4. The power-steering drive according to claim 1, wherein the output shaft extends transversally to the intermediate shaft and to the motor shaft.

5. The power-steering drive according to claim 1, wherein the intermediate shaft is adjustable relative to the motor shaft and the output shaft, and the intermediate shaft is fixable in a desired relative position.

6. The power-steering drive according to claim 1, wherein at least one of (a) the intermediate shaft and (b) at least one shaft bearing of the intermediate shaft is received, with radial play around an entire periphery, in at least one receiving opening in at least one component.

7. The power-steering drive according to claim 1, wherein the motor shaft and the output shaft are arranged in a fixed, non-adjustable relative position with respect to each other.

8. The power-steering drive according to claim 1, wherein the intermediate shaft is fixable exclusively on the basis of being braced axially against at least one component.

9. A method for adjusting a combined worm-belt transmission of a power-steering drive for a motor vehicle, the power-steering drive including a motor including a motor shaft and an output shaft, the combined worm-belt transmission arranged between the motor shaft and the output shaft, the transmission including an adjustable intermediate shaft arranged as a worm, the intermediate shaft being adjustable in a radial direction over an entire length of the intermediate shaft and parallel to the motor shaft, comprising:
    adjusting the transmission by solely adjusting the intermediate shaft relative to the motor shaft and the output shaft.

10. The method according to claim 9, wherein the adjusting includes adjusting the intermediate shaft by applying a defined adjusting force in a defined direction of force.

11. The method according to claim 10, wherein the adjusting includes:
    measuring the adjusting force during the adjusting process;
    stopping the adjusting process when the defined adjusting force is reached; and
    fixing the intermediate shaft.

12. The method according to claim 9, wherein the adjusting include adjusting the intermediate shaft by a predetermined travel.

13. The method according to claim 9, wherein the intermediate shaft is adjusted using an independent shaft shifting device.

* * * * *